United States Patent
Abd Al Hadi et al.

(10) Patent No.: US 12,360,911 B2
(45) Date of Patent: *Jul. 15, 2025

(54) CACHE PURGING IN A DISTRIBUTED NETWORKED SYSTEM

(71) Applicant: CLOUDFLARE, INC., San Francisco, CA (US)

(72) Inventors: Zaidoon Abd Al Hadi, Ontario (CA); Connor Harwood, Los Angeles, CA (US); Alex Krivit, Denver, CO (US); Samantha Aki Shugaeva, Palo Alto, CA (US); Steven Alexander Siloti, San Mateo, CA (US)

(73) Assignee: CLOUDFARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,032

(22) Filed: Apr. 15, 2024

(65) Prior Publication Data
US 2025/0117334 A1   Apr. 10, 2025

Related U.S. Application Data

(63) Continuation of application No. 18/482,707, filed on Oct. 6, 2023, now Pat. No. 11,960,407.

(51) Int. Cl.
*G06F 12/08* (2016.01)
*G06F 12/0891* (2016.01)
*G06F 12/14* (2006.01)

(52) U.S. Cl.
CPC ...... *G06F 12/0891* (2013.01); *G06F 12/1466* (2013.01)

(58) Field of Classification Search
CPC .. G06F 12/1483; G06F 12/1466; G06F 12/14; G06F 12/0891; G06F 12/08
See application file for complete search history.

(56) References Cited

U.S. PATENT DOCUMENTS

| | | | |
|---|---|---|---|
| 8,880,634 B2 | 11/2014 | Burckart et al. | |
| 10,176,106 B2 | 1/2019 | Aronovich et al. | |
| 10,313,473 B2 | 6/2019 | Anand et al. | |
| 10,887,419 B2 | 1/2021 | Anand et al. | |

(Continued)

FOREIGN PATENT DOCUMENTS

| | | | | |
|---|---|---|---|---|
| WO | WO-2007050209 A2 * | 5/2007 | ......... | G06F 21/6209 |
| WO | 2017/023365 A1 | 2/2017 | | |
| WO | 2018/129003 A1 | 7/2018 | | |
| WO | WO-2019204487 A1 * | 10/2019 | ........... | G06F 21/602 |

OTHER PUBLICATIONS

"IEEE Standard for Scalable Coherent Interface (SCI).," in IEEE Std 1596-1992, vol., No., pp.i-, 1993.

(Continued)

*Primary Examiner* — Pierre Michel Bataille
(74) *Attorney, Agent, or Firm* — NICHOLSON DE VOS WEBSTER & ELLIOTT LLP

(57) ABSTRACT

Purging resources from a cache in a distributed networked system is described. A compute server of a first data center of the distributed networked system receives a purge request to purge a resource from cache. If the purge request does not include a cache key, the compute server determines whether the purge request is valid, and if valid, purges the resource from cache of the first data center, generates a cache key for the resource, and causes the purge request that includes the generated cache key to be sent to other data centers of the distributed networked system for purging the resource from cache. If the purge request includes a cache key, the compute server skips determining whether the purge request is valid and purges the resource from cache based on the cache key.

20 Claims, 7 Drawing Sheets

(56) References Cited

U.S. PATENT DOCUMENTS

| | | |
|---|---|---|
| 11,265,395 B2 | 3/2022 | Spang et al. |
| 11,860,789 B2 * | 1/2024 | Mulder .............. G06F 12/0808 |
| 2011/0246518 A1 | 10/2011 | Mehrotra et al. |
| 2014/0281253 A1 | 9/2014 | Cadigan et al. |
| 2016/0301656 A1 | 10/2016 | Akcin |
| 2019/0065085 A1 | 2/2019 | Jean |
| 2019/0318102 A1 | 10/2019 | Araya et al. |
| 2020/0341902 A1 * | 10/2020 | Ambroladze ....... G06F 12/0891 |
| 2023/0297509 A1 | 9/2023 | Mulder et al. |

OTHER PUBLICATIONS

"What is purging?" Fastly documentaion, May 2, 2022, 5 pages, downloaded at: https://docs.fastly.com/en/fundamentals/what-is-purging.

Alex Krivit, "Part 1: Rethinking Cache Purge, Fast and Scalable Global Cache Invalidation", The Cloudflare Blog, Cloudflare Inc., May 14, 2022, 20 pages, downloaded at: https://blog.cloudflare.com/part1-coreless-purge/.

L. Kang, R.-S. Chen, Y.-C. Chen, C.-C. Wang, X. Li and T.-Y. Wu, "Using Cache Optimization Method to Reduce Network Traffic in Communication Systems Based on Cloud Computing," in IEEE Access, vol. 7, pp. 124397-124409, 2019.

Notice of Allowance, U.S. Appl. No. 18/482,707, Nov. 29, 2023, 13 pages.

Zaidoon Abo Al Hadi, "Part 2: Rethinking cache purge with a new architecture", The Cloudflare Blog, Cloudflare Inc., Jun. 21, 2023, 15 pages, downloaded at: https://blog.cloudflare.com/rethinking-cache-purge-architecture/.

\* cited by examiner

CACHE PURGING IN A DISTRIBUTED NETWORKED SYSTEM

CROSS-REFERENCE TO RELATED APPLICATIONS

This application is a continuation of application Ser. No. 18/482,707, filed Oct. 6, 2023, which is hereby incorporated by reference.

FIELD

Embodiments of the invention relate to the field of network communications, and more specifically, to implementing cache purging in a distributed networked system.

BACKGROUND

Hosts are concerned with maintaining high security, performance, and reliability of their hosted resources, such as applications and web resources (e.g., websites). Network traffic related to resources can include requests to access, retrieve, and/or modify resources hosted by an origin server. As the popularity of a resource increases, so does the amount of network traffic that is directed to the origin server that hosts the resource. Heavy traffic can affect the security, performance, and reliability of a resource. One way to mitigate the need for excessive requests to an origin server is to cache the resource so that instead of an origin server responding to every request, data centers around the world can respond and retrieve requested resources from a cache that is geographically close to the requestor.

However, resources can be updated over time leading to the cached resources no longer corresponding to the updated resources. Cache purging is the process of invalidating cached resources and informing the data centers to stop serving the cached resources to client requests and instead retrieving the updated resources from the origin server.

Origin servers host resources that are accessible by various client devices through requests sent through data centers, proxy servers, and other systems. When a client device requests access to a resource hosted by an origin server, the response to the request can be served from either the origin server or from a cache associated with an intermediary handling the request. When resources are cached in multiple data centers across several geographical areas, the standard method for purging cached network resources includes distributing a purge request to all data centers where the resource is cached. When a data center receives a purge request for a cached resource, it locates the cached resource and invalidates the cache resource to ensure that subsequent client requests for that resource are not served a stale/outdated resource. This process repeats for every data center caching the resource. However, maintaining consistency of the resource across the data centers when some data centers are unreachable or go offline, is a challenge, as purge requests can get dropped and never reach data centers when they are down.

Additionally, requests for a resource as well as resource updates can happen at any time and may not follow a pattern of predictability. Thus, when content changes and a purge request is sent, it needs to be distributed across the globe quickly. If purging an individual resource, e.g., an image, takes too long, some client requests will be served the updated version of the resource, while others are served outdated versions. This data inconsistency degrades user experience and can lead to confusion as to which version is the "right" version. Websites can sometimes even break in their entirety due to this purge latency.

One conventional solution to purging a cached resource is to use a central/core data center to distribute a purge request to the data centers that cache the resource. In this approach, when a purge request is received at a data center, the request is forwarded to a central data center (e.g., a data center responsible for network management activities), the central data center can determine whether the request is a valid request and if valid, distributes it to all the other data centers. When received by a data center, the purge request is processed, and the network resource is located and either removed or marked as stale. These stale/removed resources are not served in response to requests and are instead re-pulled from the origin server. In some approaches after being pulled from the origin server, the response is written to cache again, replacing the purged version. In this conventional solution, the cache purge system is based on central authorization, authentication, and request distribution. While this approach can provide a high-reliability service, the centralization of these operations is a bottleneck in terms of scale and performance, particularly when a data center network continues to expand globally. Further, the centralized approach does not solve the problem of request loss when data centers are unreachable or go offline, which leads to resource inconsistencies in the network of data centers.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Cache purging in a distributed networked system is described. A request to purge a resource from cache is received at a data center of the distributed networked system. If the request does not include a cache key for the resource, a determination is made as to whether the purge request is valid, and if valid, the resource is purged from a cache of the data center, a cache key is generated, and an updated purge request is sent to one or more other data centers of the distributed network system. This updated purge request includes the generated cache key. If the request includes a cache key for the resource (e.g., the cache key being previously generated at another data center), the resource is purged from a cache of the data center based on that cache key without determining whether the purge request is valid and/or without generating a cache key for the resource.

Embodiments described herein provide many technical advantages, in addition to addressing the deficiencies of previous solutions. The embodiments herein provide improvements to the processing of requests for purging resources cached in a distributed networked system that can be realized by accelerating the processing of the requests by allowing multiple data centers to skip several operations in the processing of the purge requests. The operations can be skipped due to the forwarding of a cache key for the resource by an initial data center that successfully purges the resource from its cache. Additionally, the embodiments herein provide a distribution network for the purge requests that is parallelized and resilient to failure or disconnections of one or more data centers responsible for distributing the purge requests to their respective regions. Thus, the embodiments herein reduce latency of purge request distribution across a distributed resource caching network, by parallelizing request distribution across multiple geographic regions. The use of purge request distributors to forward purge requests to data centers in their geographic regions greatly speeds up this process.

Figure 1:
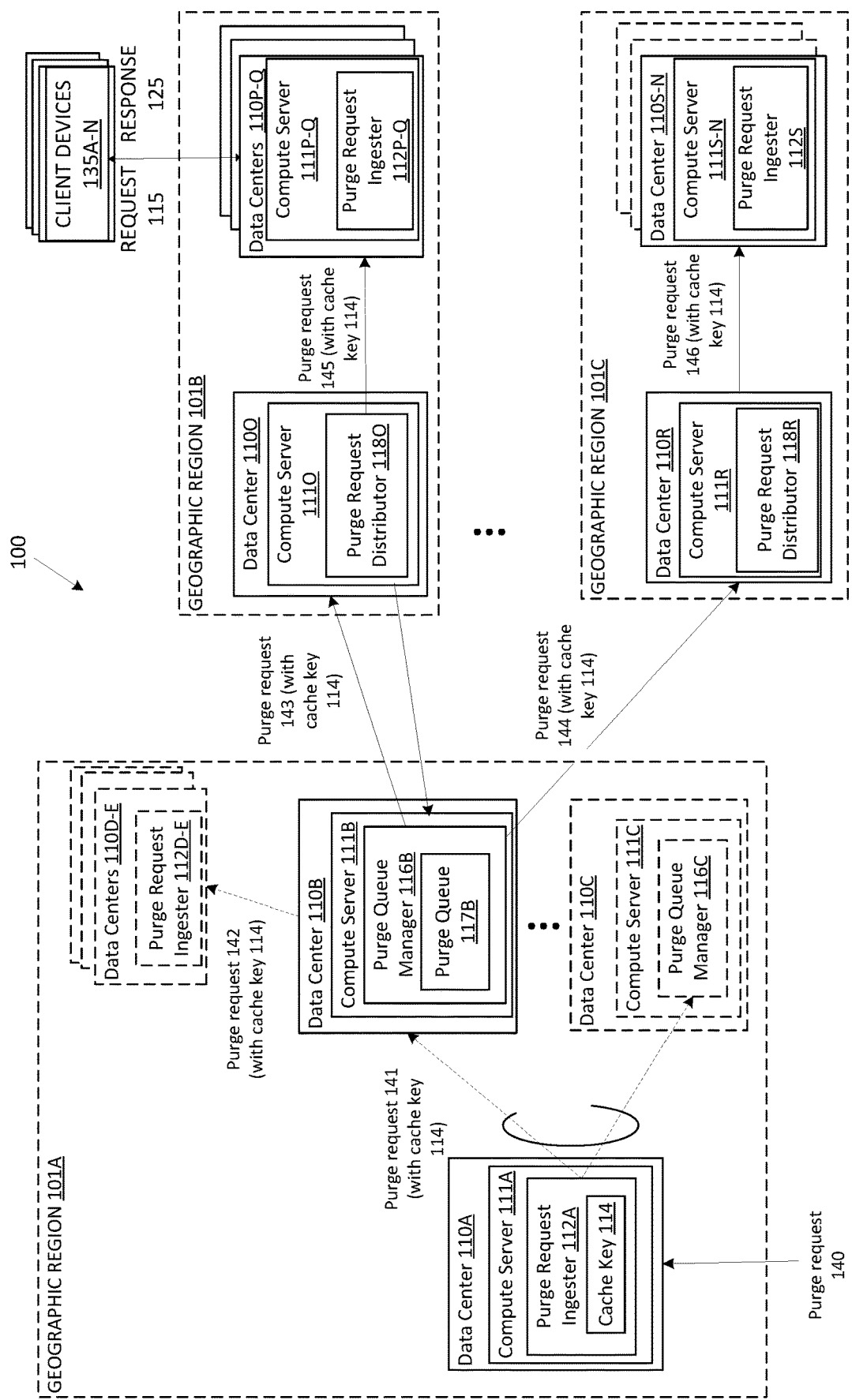
FIG. 1 illustrates an exemplary distributed networked system according to some embodiments described herein.

FIG. 1 illustrates an exemplary distributed networked system according to some embodiments described herein. The exemplary distributed networked system 100 illustrated in FIG. 1 includes data centers 110A-N. In some embodiments, the data centers 110A-N are connected to an origin server (not illustrated), and multiple client devices e.g., client devices 135A-N.

Examples of an origin server include computing devices that may serve and/or generate network resources (e.g., web pages, images, word processing documents, PDF files, movie files, music files, or other computer files). Although not illustrated in FIG. 1, the network resources of an origin server may be stored separately from the device that responds to the requests. In some embodiments, each of the data centers 110A-N are connected directly with the origin server. In other embodiments, the data centers 110A-N can be indirectly connected with the origin server where data originating at a data center may pass through other servers and/or data centers before reaching the origin server.

Examples of client devices 135A-N include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 135A-N executes a client network application that is capable of transmitting and/or receiving network traffic. For example, the network application may be a web browser or other application that can send requests to access and display network resources (e.g., web pages, images, word processing documents, PDF files, movie files, music files, or other computer files).

In one embodiment, data centers 110A-N are distributed across multiple geographic regions housing networking devices. For example, data centers 110A, 110B, 110C, and 110D-E are located within geographic region 101A. Data centers 110O-Q are located within another geographic region 101B that is different from geographic region 101A. Data centers 110R-N are located within a third geographic region 101C that is different from geographic region 101A and different from geographic region 101B. Each of the data centers 110A-N includes a plurality of compute servers. FIG. 1 illustrates one compute server in each of the different data centers. However, this is for descriptive purposes and each data center includes multiple compute servers. Each of data centers 110A-N can also include one or more control servers, one or more domain name system (DNS) servers, and/or one or more other pieces of network equipment such as router(s), switch(es), and/or hubs. The compute servers of data centers 110A-N receive requests to access and/or modify the resources hosted by the origin server, and further receive responses to such requests with the requested resources from the origin server. For example, web traffic (e.g., HTTP requests/responses, HTTPS requests/responses, SPDY requests/responses, HTTP/2 requests, responses, etc.) for domains handled by the origin server may be received at data centers 110A-N. The compute servers may retrieve the requested resources from a cache of the data center (instead of receiving the requested resources from the origin server) and transmit responses to such requests with the requested resources to the client devices, e.g., client devices 135A-N.

As depicted in FIG. 1, a compute server in one of the data centers (e.g., the compute server 111P in the data center 110P) receives a request 115 from one of the client devices 135A-N. The compute server receives requests to access and/or modify the resources hosted by the origin server, and further transmits responses (e.g., response 125) to such requests with the requested resources to the client device 135A. In some embodiments, data center 110P includes compute servers that store a copy of the resources hosted by the origin server in a cache of the data center 110P (not illustrated) and respond to requests for the resource by retrieving the resource from the cache instead of retrieving it from the origin server. While the illustrated example shows that the data center receiving the request is the one responding to the request from the client device, in other embodiments, data center 110P is a proxying data center and receives the request of the client device through an intermediary data center (not illustrated). In this configuration, requests to access resources hosted by the origin server are received by data center 110P instead of being transmitted directly to the origin server. Further, response messages (e.g., response 125) that include the requested resource are sent from the origin server through data center 110P, or alternatively, directly from data center 110P if the requested resource is accessible in a cache associated with data center 110P (e.g., the resource has not been deleted or has been marked as stale as it will be described in further detail below). Similarly to data center 110P, other data centers of system 100 may store copies of the resource in their respective cache and may operate as reverse proxies and receive requests for network resources (e.g., HTTP requests) of a domain of the origin server. In some embodiments, the particular computing device of a data center that receives a request from a client device may be determined by the network infrastructure according to an Anycast implementation or by a geographical load balancer.

The system 100 receives a purge request 140 for a network resource and, if valid, updates the caches of the data centers 110A-N, in response to the purge request, to indicate that the stored copy of the resource is no longer valid. The purge request 140 is a request to purge a resource. The resource may be of a domain hosted by an origin server from the caches of the data centers 110A-N. The purge request 140 can be triggered by an administrator of the domain of the network resource. For example, the distributed networked system 100 can include an application programming interface (API) and/or a user interface that allows the administrator of the domain to generate a purge request. The API and/or user interface may be executing on a control server of each of the data centers 110A-N. In some embodiments, the purge request 140 is received at the data center that is closest to the requesting client device in terms of routing protocol configuration (e.g., Border Gateway Protocol (BGP) configuration) according to an anycast implementation as determined by the network infrastructure (e.g., router(s), switch(es), and/or other network equipment between the client device of the domain administrator and the data centers 110A-N. For example, the purge request 140 is received at a control server of data center 110A or a compute server of data center 110A where the data center 110A is closest to the client device from which the request was triggered by an administrator of the network resource's domain according to an anycast implementation. In some embodiments, instead of using an anycast mechanism, a geographical load balancer is used to route the purge request 140 to the nearest data center. The purge request 140 includes an identifier that identifies the resource to be purged from the cache. The identifier of the resource can include a Uniform Resource Locator (URL) of the resource. In some embodiments, the purge request includes multiple identifiers identifying multiple resources (e.g., hundreds of resources) that are to be purged.

As illustrated in FIG. 1, the purge request 140 is received at a compute server 111A of the data center 110A. The compute server 111A includes a purge request ingester 112A. In one embodiment, purge request ingester 112A is code that can be deployed to all or some of the compute servers of the distributed networked system 100. The purge request ingester 112A can be a piece of JavaScript or other interpreted language, a WebAssembly (WASM) compiled piece of code, or other compiled code. The purge request ingester 112A may be a worker script as described herein.

If a purge request is received from another data center, the purge request may include a cache key for the network resource to be purged. The cache key uniquely identifies a resource in cache. A cache key included in a purge request may indicate that the purge of the resource was successfully performed at that data center. In some embodiments, the cache key includes two elements, a backend cache key, and a proxy cache key. The backend cache key is used to identify the particular server in the data center that has the cached resource. The proxy cache key is used to identify the resource in the cache of the identified server in the data center. In other embodiments, the cache key includes a single element (e.g., the proxy cache key) that identifies the server that holds the cached resource and identifies the cached resource. In some embodiments, when a purge request includes several resource identifiers (e.g., several URLs of resources to purge), the purge request includes several cache keys. The cache key enables the purge request ingester to skip one or more operations in the processing of the purge request, which considerably speeds up the purge of the resource across the distributed networked system 100.

Purge request ingester 112A determines whether purge request 140 includes a cache key for the network resource. The processing of the purge request is different depending on whether the cache key is included in the purge request. If the purge request 140 does not include the cache key, the processing of the purge request 140 includes determining whether the requested purge is valid, purging the resource from cache of the data center (executing the purge), and generating a cache key 114 for the resource. Determining whether the requested purge is valid includes determining one or more of the following: determining whether the purge request is syntactically or grammatically valid (e.g., whether the purge request can be properly parsed), determining whether executing the purge request would exceed a rate limit, determining whether the requester is authorized to purge the resource, and determining whether the resource is cacheable. After generation of cache key 114, the purge request with the cache key is sent to the other data centers. A cache key in a purge request indicates that the purge of the resource is valid. If the purge request includes a cache key, the processing of the purge request includes purging the resource from the cache of the data center based on the cache key (executing the purge) and does not include determining whether the requested purge is valid and does not include generating a cache key for the resource (as it has already been pre-computed for the resource). Further, the purge request with the cache key may not be further sent to other data centers.

In some embodiments, the purge request with the cache key is transmitted to a purge queue manager 116 to be broadcasted to one or more other data centers. The purge queue manager 116 stores state related to the purge requests including a purge queue that stores purge requests received at that instance of the purge queue manager 116. For example, the purge queue manager 116B, running on the compute server 111B, maintains the purge queue 117B. The purge queue 117B stores purge requests received at purge queue manager 116B. In some embodiments, in addition to the purge queue 117B, the stored state further includes a status index that identifies how far along in the queue each data center associated with the purge queue manager 116B is in processing purge requests. Purge queue 117B stores a record of all purge requests received at the purge queue manager 116B that are being processed in multiple data centers, which allows system 100 to automatically recover from connectivity issues of the data centers and/or the data centers coming back online after maintenance. Having a record of all purges since an issue arose (e.g., disconnection of a data center, or a data center going down) allows purge queue manager 116B to resend those purge requests to the data center ensuring that all data centers receive and process the purge requests.

There may be multiple instances of the purge queue manager 116 running in the geographic region 101A (e.g., running on all or some of the data centers of the geographic region 101A) and in each other geographic region (e.g., the geographic regions 101B and 101C). Each instance of the purge queue manager 116 stores its own state (e.g., own purge queues). The purge request ingester 112A selects an instance of the purge queue manager 116 for forwarding the purge request. The selection of the instance of the purge queue manager 116 can be based on a load balancing mechanism. The selection may prefer or require selection of an instance of the purge queue manager 116 running in the same geographic region as the purge request ingester. As shown in FIG. 1, the purge request ingester 112A, running in the geographic region 101A, selects the purge queue manager 116B executing at a compute server 111B of the data center 110B and not a purge queue manager 116C executing at a compute server 111C of the data center 110C. Thus, the purge request ingester 112A transmits the purge request 141, which includes the cache key 114, to the purge queue manager 116B. Although FIG. 1 shows the selected purge queue manager 116 on a different data center than the data center that received the initial purge request 140, the selected purge queue manager 116 may be on the same data center as the data center that received the initial purge request (e.g., on the data center 110A).

In some embodiments, an instance of a purge queue manager 116 is an object worker. An object worker includes a combination of an instantiation of a piece of code and an object that belongs to the instantiation of the piece of code. Each instance of an object worker has its own private and persistent data that the object worker can read and/or modify and which no other object worker can directly access. The piece of code can be a worker script. An object worker locks the data such that it is the sole owner of the data while it is being executed. Other entities that wish to interact with the data send messages to the object worker that owns the data. In an embodiment, a particular object worker script is loaded and executed on-demand (when and only if it is needed) at a particular compute server of the distributed networked system.

The purge queue manager 116B broadcasts the purge request that includes the generated cache key (e.g., cache key 114) by sending the purge request 142 to one or more purge request ingesters (e.g., purge request ingesters 112D-E of data centers 110D-E) in the same geographic region as the purge queue manager 116B. While not illustrated, purge queue manager 116B can send the purge request including the generated cache key to a purge request ingester that is located in the same data center 110B. The purge request ingesters of the data centers 110B-E operate like purge request ingesters 112P-Q described later herein. Additionally, the purge queue manager 116B selects one or more purge request distributors, such as the purge request distributor 118O running on the compute server 111O and the purge request distributor 118R running on the compute server 111R, that are located in different geographic regions, for example regions 101B and 101C, to send the purge request (noted as the purge request 143 and the purge request 144).

Each one of the purge request distributors 118O and 118R receives one or more purge requests from purge queue manager 116B and forwards them to one or more data centers identified by the purge queue manager 116B. For example, purge queue manager 116B sends purge request 143 for purging the resource identified in the initial purge request 140. The purge request 143 includes the generated cache key 114. In one embodiment, purge queue manager 116B also provides purge request distributor 118B a set of identifiers that identify one or more data centers where the purge request is to be sent. In some embodiments, purge request distributor 118B is a worker script. Purge request distributor 118O maintains a sliding window replica of entries from queue 117B. In some embodiments, the replica includes the most recent entries to queue 117B. For instance, the replica is shorter than queue 117B, containing the most recent thousand purge requests. If the state (e.g., the sliding window of replica queue entries) of a purge request distributor 118 is lost, such as if the compute server that is executing that purge request distributor 118 goes down, the purge queue manager 116 initializes a new instance of the purge request distributor 118 based on the last state update received from the previous purge request distributor 118.

Purge request distributor 118O distributes the purge request to one or more data centers as identified by purge queue manager 116B. For example, purge request distributor 118O sends purge request 145, which includes cache key 114, to purge request ingesters 112P-Q of data centers 110P-Q. In some embodiments, purge request distributor 118O uses an asynchronous queue instead of synchronous multicast requests to avoid potential cross-data center performance problems. For example, the use of the asynchronous queue allows to avoid a slowdown in other data centers, when one of the data centers experiences high latency. While not illustrated, purge request distributor 118O also sends the purge request to a purge request ingester that is in the same data center 110R. The purge request ingester of data center 110R operates like purge request ingester 112P-Q described later herein.

Each of purge request ingesters 112P-Q performs operations similar to the operations performed by purge request ingester 112A upon receipt of purge request 140. In this case, each of purge request ingester 112P-Q determines that the request includes the cache key 114, and in response to this determination, processes the request by purging the resource from the cache of the respective data center without determining whether the purge request is valid, without generating a cache key for the resource (as has already been pre-computed for the resource), and without broadcasting the purge request with the cache key to other data centers. The processing of the purge request 145 based on cache key 114 significantly speeds up the purge of the resource within the system 100 as several purge request ingesters 112P-Q can skip multiple operations of processing a purge request based on the pre-computed cache key 114. The cache key 114 being included in a purge request is an indication that the identified resource can be purged from the cache of the data centers, as it has been determined by purge request ingester 112A that the purge of that resource in a first data center was successful. Bypassing these operations when performing the purge of the resource eliminates a majority of the CPU time that would be consumed for processing a purge request not including the cache key. This allows a much larger number of purge requests to be handled without overloading the data centers of system 100.

Figure 2:
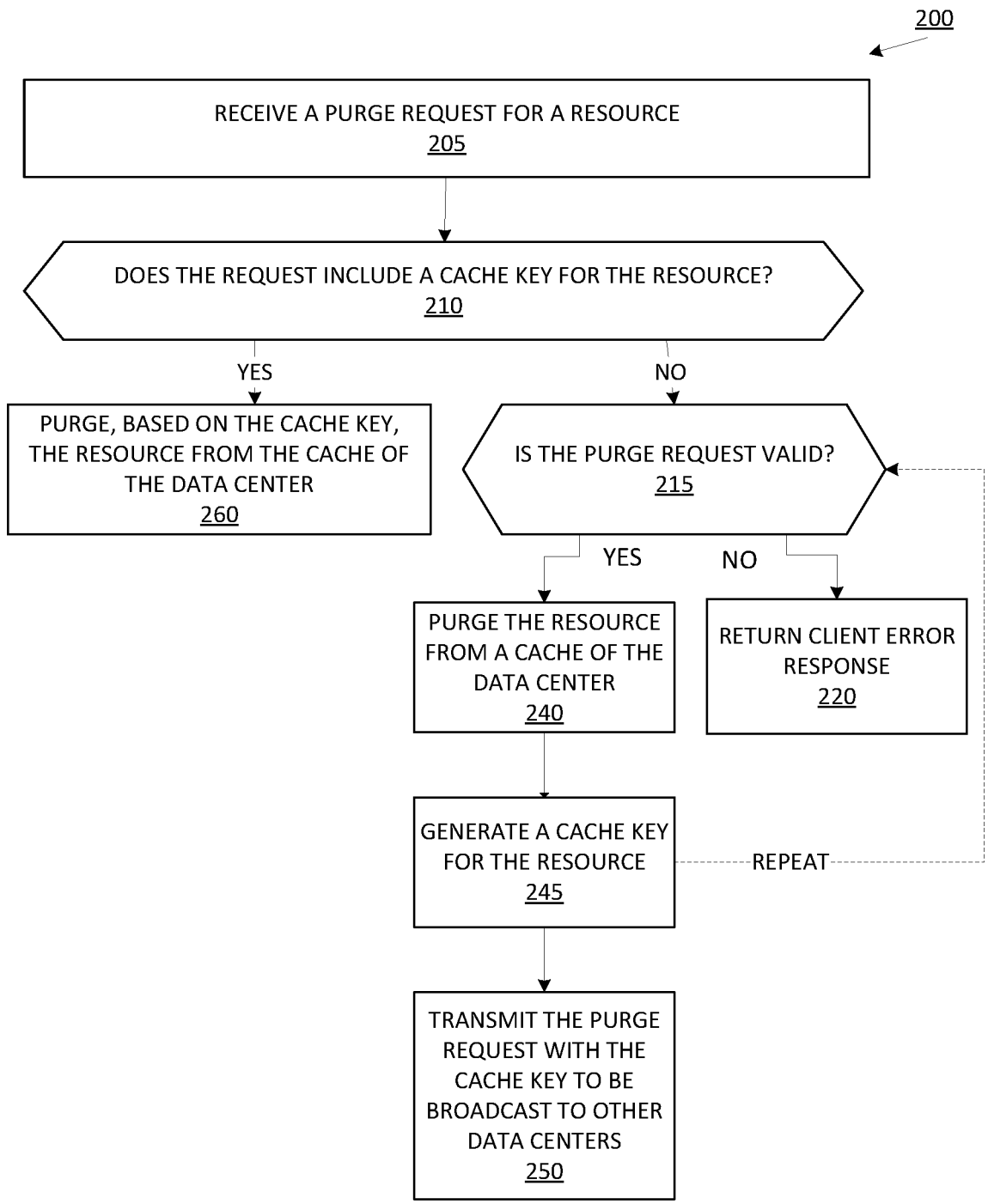
FIG. 2 is a flow diagram that illustrates exemplary operations for purging a resource from a cache of data centers in a distributed networked system, according to an embodiment.

FIG. 2 is a flow diagram that illustrates exemplary operations 200 for purging a resource from a cache of data centers in a distributed networked system, according to an embodiment. The operations of FIG. 2 will be described with reference to the exemplary embodiment of FIG. 1. However, the operations of FIG. 2 can be performed by embodiments other than those discussed with reference to FIG. 1, and the embodiments discussed with reference to FIG. 1 can perform operations different than those discussed with reference to FIG. 2. The operations of FIG. 2 are described as being performed by a purge request ingester.

In operation 205, a purge request ingester receives a purge request for a resource. The purge request is a request to purge a resource from one or more caches of the data centers 110A-N. The purge request includes an identifier that identifies the resource to be purged from the cache, such as a URL of the resource. In an embodiment the purge request includes multiple identifiers identifying multiple resources (e.g., hundreds of resources) that are to be purged. The purge request can be received via a request from a computing device operated by an administrator of the domain of the resource (e.g., through an API or through a user interface). As an example, the purge request 140 is received at the purge request ingester 112A via a request from an administrator of the domain and the purge request 145 is received at the purge request ingester.

In operation 210, the purge request ingester determines whether the purge request includes a cache key for the network resource. For example, purge request ingester parses the request to determine whether it includes the cache key. In some embodiments, parsing the request includes identifying one or more identifiers of one or more resources to be purged (e.g., retrieving one or more URLs), identifying an owner of the request (requester), identifying a domain name of the resource(s), and identifying a cache key for each of the resource(s) in the request. In some embodiments, additional information can be retrieved from the parsing of the purge request such as timing information and location of the initial purge request ingester. Although the purge request can include multiple identifiers for multiple resources to be purged, FIG. 2 is described with respect to a single resource and associated cache key. However, if there are multiple identifiers for multiple resources, the operations are performed for multiple resources associated with multiple cache keys, respectively. For example, one or more operations can be repeated for each resource.

In response to determining that the purge request includes a cache key for the resource, the flow of operations moves to operation 260. In operation 260, the purge request ingester purges the resource from the cache of the data center based on the cache key. If the cache key is included in the purge request, the purge request ingester skips the operations of determining whether the purge request is valid and generating a cache key. For example, with respect to FIG. 2, the operations 215, 220, 240, 245, and 250 are not performed. This accelerates the execution of the purges by allowing multiple data centers to skip operations in the processing of the purge requests.

With respect to FIG. 1, for example, purge request ingester 112P determines that purge request 145 includes cache key 114. In response to determining that purge request 145 includes cache key 114, purge request ingester 112P purges the resource from the cache of the data center based on cache key 114. Similarly, purge request ingester 112S determines that purge request 146 includes cache key 114. In response to determining that purge request 146 includes cache key 114, purge request ingester 112S purges the resource from the cache of the data center based on cache key 114. Purging the resource from the cache is performed without determining whether the purge request is valid and without generating a cache key for the resource (as has already been pre-computed for the resource). In some embodiments, purging the resource from the cache of a data center includes deleting the resource from the cache of data center 110P and data center 110S respectively and/or marking the resource as stale in the respective cache. When the request includes several resources associated with respective cache keys, each resource is purged from the cache based on its associated cache key.

If the purge request does not include the cache key, the purge request ingester processes the purge request without the pre-computed cache key. In some embodiments, processing the purge request includes operations 215, and one or more of operations 220, 240, 245, and 250. Responsive to determining that the request does not include a cache key, the flow of operations moves from operation 210 to operation 215.

Figure 3:
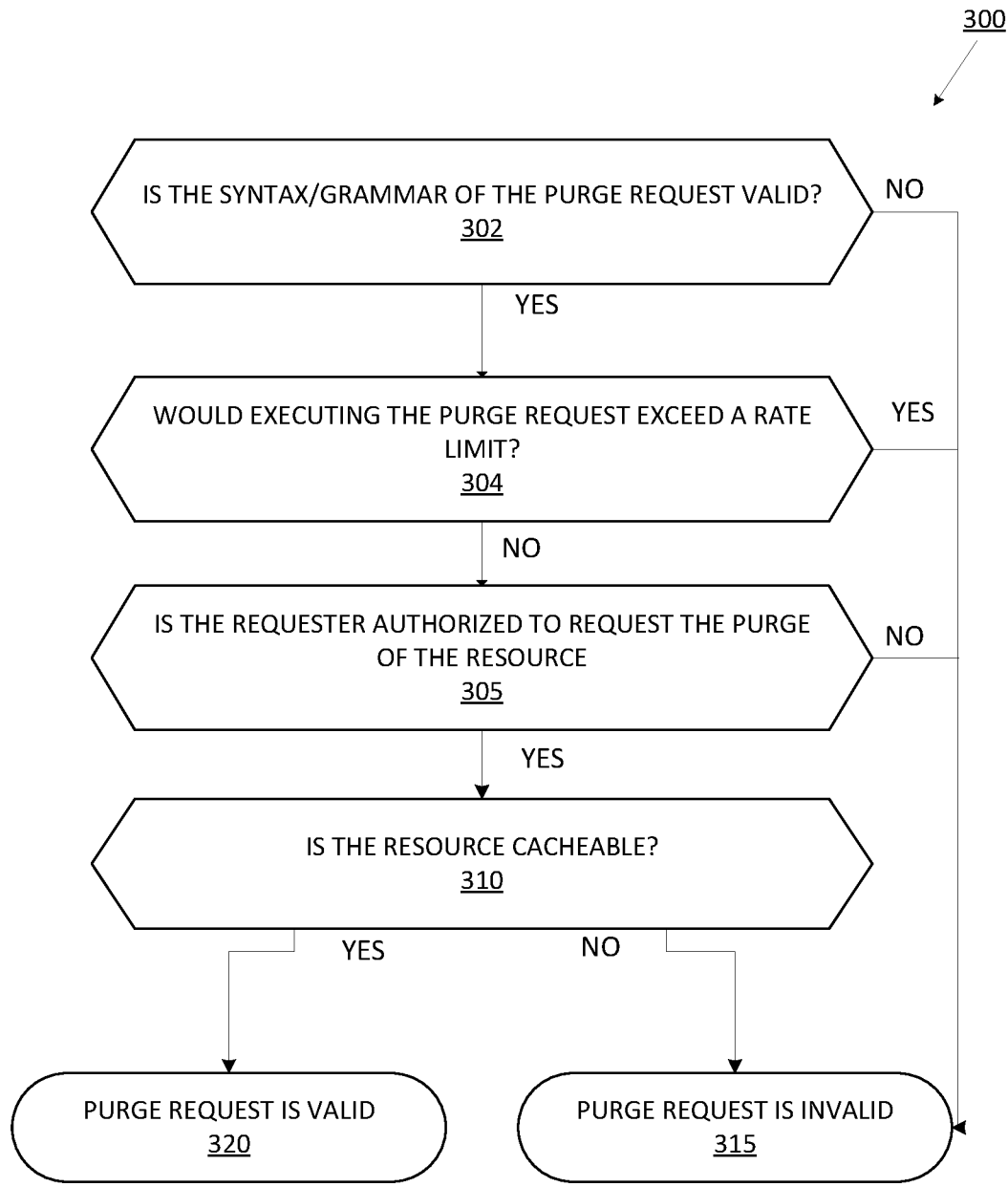
FIG. 3 illustrates a flow diagram of exemplary operations that can be performed for determining whether a purge request is valid, according to some embodiments.

In operation 215, the purge request ingester determines whether the purge request is valid. FIG. 3 describes exemplary operations for determining whether a purge request is valid according to an embodiment. If it is determined that purge request 140 is not valid, the flow of operations moves to operation 220. Alternatively, if it is determined that purge request 140 is valid, the flow of operations moves to operation 240.

FIG. 3 illustrates a flow diagram of exemplary operations 300 that can be performed for determining whether a purge request is valid, according to some embodiments. The operations of FIG. 3 will be described with reference to the exemplary embodiment of FIG. 1. However, the operations of FIG. 3 can be performed by embodiments other than those discussed with reference to FIG. 1, and the embodiments discussed with reference to FIG. 1 can perform operations different than those discussed with reference to FIG. 3. The operations of FIG. 3 are described as being performed by a purge request ingester.

At operation 302, the purge request ingester determines whether the syntax and/or grammar of the purge request is valid. For instance, the purge request ingester determines whether the purge request can be properly parsed. The purge request ingester may check whether the request body conforms to the purge request format (e.g., conforms to the API) and/or whether the URLs in the request are RFC compliant (e.g., RFC 8820). If the syntax and/or grammar of the purge request is valid, then flow moves to operation 304. If the syntax and/or grammar of the purge request is not valid, then flow moves to operation 315.

At operation 304, the purge request ingester determines whether executing the purge request would exceed a rate limit. For example, a rate limit of processing hundreds or thousands of purge requests per minute can be imposed on resources commonly owned or managed. In a non-limiting example, a rate limit of 1000URLs/min can be imposed. Any other rate limits can be imposed. If executing the purge request would not exceed a rate limit, then flow moves to operation 305. If executing the purge request would exceed a rate limit, then flow moves to operation 315.

At operation 305, the purge request ingester determines whether the requester is authorized to request the resource purge. For example, purge request ingester 112A looks up ownership information associated with the resource in the request 140 to determine whether the requester from which the request originated is authorized to purge the request (e.g., whether the requester owns the resource). In one embodiment, determining whether the requester is authorized to purge the resource further includes authenticating the requester. For example, if the requester cannot be authenticated (e.g., is not a customer of the system 100, is not an authorized user of system 100, etc.) the flow of operations moves to operation 315. If the requester is authorized to request the purge of the resource from the cache, the flow moves to operation 310. Alternatively, when the requester is not authorized to request the resource purge (e.g., the requester does not own the resource), the flow moves to operation 315.

At operation 310, the purge request ingester determines whether the resource referenced in the purge request is cacheable in the system 100. This determination can be based on one or more rules applicable for the resource. In some embodiments, resources of a domain can be stored in a cache by default and an administrator of the domain can set one or more rules for caching the resources. The rules identify one or more operations to be performed in the data centers for the resources upon receipt of the resources and/or purge requests for the resources. For example, the rules may indicate a subset of resources that cannot be cached (e.g., set a "bypass cache" setting for the selected subset of resources). Additionally, or alternatively, a rule can specify how long the resource can be stored in caches of system 100. The rules may further include rewrite rules. A rewrite rule for a resource can replace an element of the purge request with another element. For example, a rewrite rule can include replacing the host name in the purge request with a different host. In some embodiments, the owner of the resources can configure these rules. In other embodiments, one or more rules can be set by default (e.g., all resources are stored in cache with a predetermined time for how long the resource is to be cached, etc.). If the resource is cacheable, then the flow of operations moves to operation 320. If the resource is not cacheable, then flow moves to operation 315.

At operation 315, the purge request is determined to be invalid. With respect to FIG. 2, operations move from operation 215 to operation 220. At operation 320, the purge request is determined to be valid. With respect to FIG. 2, operations move from operation 215 to operation 240.

The operations described in FIG. 3 (e.g., the operations 302, 304, 305, and 310) can be performed in any order. Further, in an embodiment, one or more of the operations (e.g., operations 302, 304, 305, and/or 310) are not performed.

Determining whether the purge request is valid prior to attempting to execute the purge allows for filtering of superfluous purge requests that cannot be executed. The filtering results in these purge requests not being executed locally nor remotely, as they are not broadcast to other data centers, consequently freeing up resources (both locally, in the current data center, and remotely, in other data centers) to process valid purge requests.

Referring back to FIG. 2, in response to determining that the purge request is invalid, the flow of operations moves to operation 220. In operation 220, the purge request ingester returns a response to the requesting computing device indicating that the purge request cannot be performed. In some embodiments, the response can be an HTTP response with a client error response code (e.g., 400, 401, 403, or 429 status code). The particular client error response code may depend on the reason the purge request cannot be performed. For example, if the syntax and/or grammar of the request is invalid, a response with a 400 error code may be returned. As another example, if a rate limit would be exceeded, a response with a 429 error code may be returned. As another example, if the requester is not authorized, a response with a 401 or 403 error code may be returned. In an embodiment, if the resource is not cacheable, a response (with a 200 status code) is returned to the client device with a message that indicates that the resource that was requested to be purged is not cacheable.

In operation 240, the purge request ingester purges the resource from a cache of the data center. Purging the resource from the data center includes deleting the resource from the cache or marking the resource in the cache as stale. Deleting the resource from the cache or marking the resource as stale in the cache causes new client requests for the resource, received at the data center, to be answered by requesting the resource from the origin server instead of being retrieved from the cache of the data center. The flow of operations moves to operation 245.

In operation 245, the purge request ingester generates a cache key for the resource. The cache key uniquely identifies the resource in cache. A cache key included in a purge request indicates that the purge request is valid and may indicate that the purge of the resource was successfully performed at that data center. In some embodiments, the generation of the cache key can include hashing a concatenated string of elements associated with the resource based on a cache key template. The cache key template can be a default template. Alternatively, a custom template can be selected by the owner of the resource. For example, the cache key can be generated by concatenating the host name (e.g., www.example.com), the path of the resource (e.g., /logo.jpg), and/or one or more additional elements of a request for the resource (e.g., user agent, HTTP version, etc.). In some embodiments, the cache key includes two elements, a backend cache key, and a proxy cache key. The backend cache key is generated by hashing a concatenated string of a host name and the resource path. The proxy cache key is generated by hashing a concatenated string of host name, the resource path, and one or more additional elements contained in headers of the request. The backend cache key is used to identify the particular server in the data center that has the cached resource. The proxy cache key is used to identify the resource in the cache of the identified server in the data center. In other embodiments, the cache key includes a single element (e.g., the proxy cache key) that identifies the server that holds the cached resource and identifies the cached resource. In some embodiments, when the purge request includes several resource identifiers (e.g., several URLs of resources to purge), a key is generated for each resource resulting in multiple cache keys for the purge request. The flow of operations moves to operation 250.

In operation 250, the purge request including the cache key is transmitted to be broadcast to other data centers. The purge request that includes the cache key is communicated to a purge queue manager that broadcasts the cache key to other data centers. The purge request may be transmitted to a purge queue manager at a different data center. In some embodiments, when multiple cache keys are generated, the purge request is transmitted with the multiple cache keys. In these embodiments, a single purge request includes several cache keys indicating that multiple resources are to be purged from the cache of the data centers. In some embodiments, the transmission of the purge request is performed through a secure connection with the receiving data center.

Although not illustrated in FIG. 2, after determining that the purge request is valid, a purge rate limit counter may be incremented by one for the resource being processed.

Figure 4A:
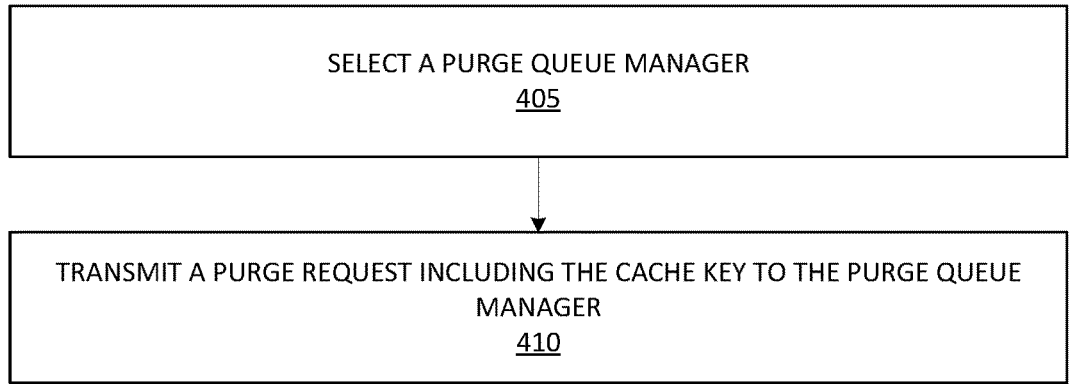
FIG. 4A illustrates a flow diagram of exemplary operations 400 that can be performed for transmitting the purge request with the cache key to be broadcast, according to some embodiments.

FIG. 4A illustrates a flow diagram of exemplary operations 400 that can be performed for transmitting the purge request with the cache key to be broadcast, according to some embodiments. The operations of FIG. 4A will be described with reference to the exemplary embodiment of FIG. 1. However, the operations of FIG. 4A can be performed by embodiments other than those discussed with reference to FIG. 1, and the embodiments discussed with reference to FIG. 1 can perform operations different than those discussed with reference to FIG. 4A. The operations of FIG. 4A are described as being performed by a purge request ingester 112A.

In operation 405, purge request ingester 112A selects a purge queue manager 116B. For example, purge queue manager 116B is selected instead of purge queue manager 116C. In some embodiments, the selection of purge queue manager 116B is based on a load balancing mechanism. For example, the purge queue manager 116B may be the purge queue manager with the lesser load when compared with the load of other purge queue managers in system 100. Additionally, or alternatively, purge queue manager 116B can be the purge queue manager closest to purge request ingester 112A. In some embodiments, purge queue manager 116B is selected randomly from multiple purge queue managers of system 100. In some embodiments, purge request ingester 112A and purge queue manager 116B are included in different data centers. Alternatively, purge request ingester 112A and purge queue manager 116B can be included in the same data center. In some embodiments, purge request ingester 112A and purge queue manager 116B are located in the same geographic region 101A. When the geographic region 101A includes a single purge queue manager 116B, this manager is automatically selected for receiving the purge request. The flow moves to operation 410.

At operation 410, purge request ingester 112A transmits purge request 141 that includes cache key 114 to purge queue manager 116B. In some embodiments, transmitting purge request 141 with the cache key includes adding cache key 114 to a header of the request. In some embodiments, cache key 114 can be added to a JSON object that is transmitted with an HTTP request to purge queue manager 116B. In some embodiments, when the purge request 140 includes multiple identifiers of resources, the purge request 141 includes the multiple identifiers of the multiple resources to be purged. In some embodiments, the transmission of the purge request is performed through a secure connection. For example, the transmission can be through an HTTP Remote Procedure Call (RPC) call over a TCP connection to the purge queue manager 116B. In some embodiments, the transmission is such that the receiving device can authenticate the transmitter of the purge request.

Figure 4B:
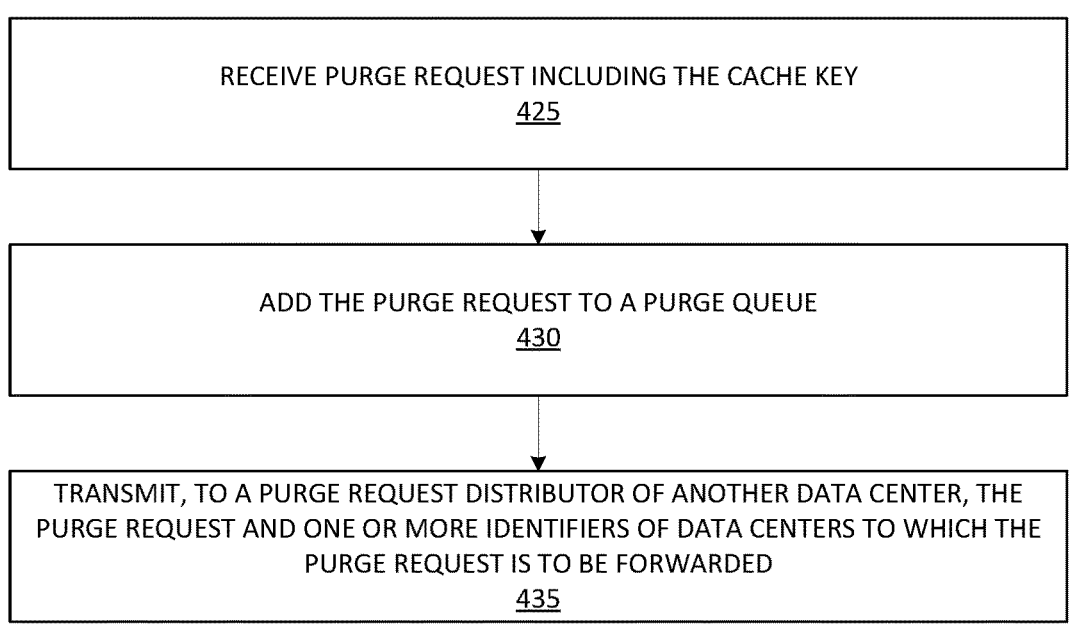
FIG. 4B illustrates a flow diagram of exemplary operations that can be performed for broadcasting a purge request with a cache key, according to some embodiments.
Figure 5:
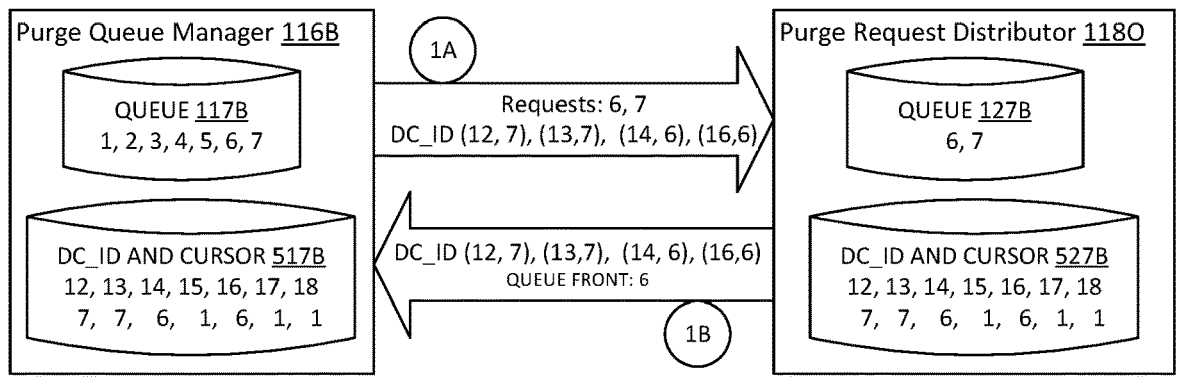
FIG. 5 illustrates a block diagram of exemplary data that can be exchanged between a purge queue manager and a purge request distributor, in accordance with some embodiments.
Figure 5:
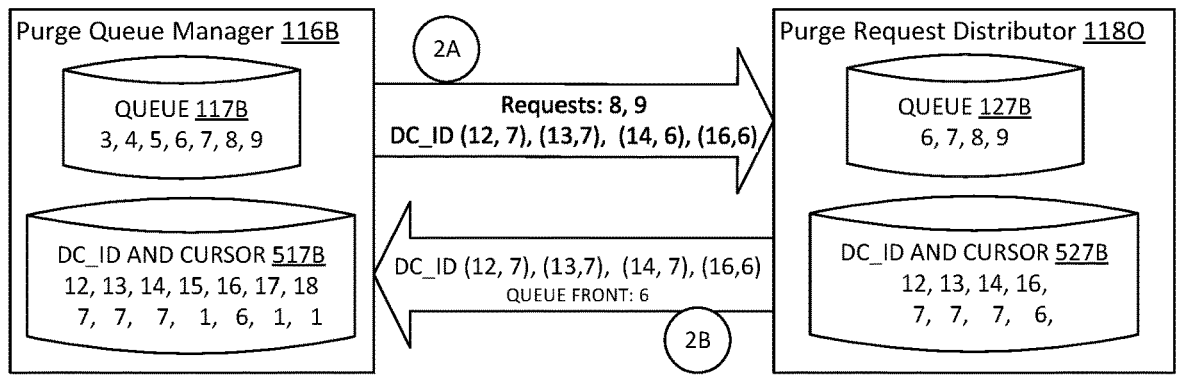
Figure 5:
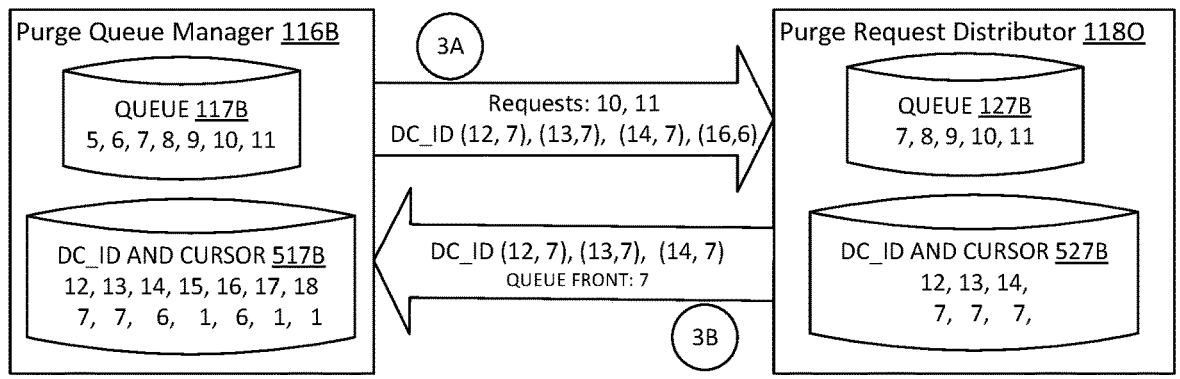

FIG. 4B illustrates a flow diagram of exemplary operations 450 that can be performed for broadcasting a purge request with a cache key, according to some embodiments. FIG. 5 illustrates a block diagram of exemplary data that can be exchanged between purge queue manager and a purge request distributor, in accordance with some embodiments. The operations of FIG. 4B will be described with reference to the exemplary embodiment of FIG. 1 and FIG. 5. However, the operations of FIG. 4B can be performed by embodiments other than those discussed with reference to FIG. 1 and FIG. 5, and the embodiments discussed with reference to FIG. 1 and FIG. 5 can perform operations different than those discussed with reference to FIG. 4B. The operations of FIG. 4B are described as being performed by a purge queue manager 116B.

In operation 425, the purge queue manager 116B receives the purge request 141 that includes cache key 114. In some embodiments, the purge request can include multiple cache keys. The purge request further identifies the one or more resources to be purged. The purge request can include one or more additional information associated with the resource. The flow of operations moves to operation 430. In operation 430, purge queue manager 116B adds purge request 141 to a queue, e.g., purge queue 117B. The purge requests added to queue 117B are to be sent to all data centers of system 100 that cache the resource. The transmission of the requests in the queue to the data centers is performed through intermediary purge request distributors.

In some embodiments, the purge queue manager 116B selects one or more purge request distributors, where the distributors are located in different geographic regions. The purge request distributors are then used to distribute requests to the data centers in their respective regions. In some embodiments, the selection of a purge request distributor in a geographic region is performed when queue 117B is initialized. Purge queue manager 116B selects a purge request distributor for a geographic region based on which data center first responds to one or more initial purge requests sent by purge queue manager 116B. Any of the data centers in the same region can assume the role of a purge request distributor making the system resilient to failure of or lost connections with a distributor. When a purge request distributor of a given region is no longer reachable or is offline, another data center can take over the functionality of purge request distributor for that region. Sending purge requests to one or multiple purge request distributors to forward the requests to data centers allows purge queue manager 116B to make a fraction of the requests it would if it were to broadcast the request to every data center directly, which considerably increases its efficiency in processing purge requests.

The purge queue manager 116B can continuously update the assignment of purge request distributor for a region. In some embodiments, when one or more purge requests are successfully sent to a data center, purge queue manager 116B determines whether there is an existing purge request distributor for the data center's geographic region. If there is no assigned purge request distributor for the region, the data center is assigned as the new purge request distributor for the geographic region. If there is an assigned purge request distributor for the region, the purge queue manager 116B determines whether the data center's associated cursor position is greater than the queue front index of the assigned purge request distributor. When the data center's associated cursor position is greater than the queue front index of the assigned purge request distributor, the data center is added to the list of data centers that are delegated to the purge request distributor. Delegating the data center to the distributor indicates that the distributor is to forward purge requests to the data center instead of the requests being transmitted from the purge queue manager 116B.

Alternatively, when one or more purge requests are not successfully transmitted to a data center, the purge queue manager 116B determines whether the data center was assigned as a purge request distributor. In response to determining that the data center was assigned as a purge request distributor, the purge queue manager 116B removes the data center as the assigned purge request distributor for its region and un-delegates any data center that had been delegated to this distributor to receive purge requests through the distributor. Once a distributor is assigned to each geographic region, the purge queue manager 116B forwards purge requests to data centers through the distributor as described in further detail below.

Referring to FIG. 5, the purge queue 117B stores purge requests received from one or more purge request ingesters, e.g., the purge request ingester 112A. In the illustrated example of FIG. 5, the purge queue 117B includes multiple purge requests at positions 1, 2, 3, 4, 5, 6, 7 in the queue. While the example illustrates a small number of purge requests in the queue 117B, the queue 117B may include hundreds or thousands of purge requests. In this example, the purge request 141 is the purge request at position 6 in the queue 117B. Requests stored at position 6 and 7 (which are referred to as requests 6 and 7 hereafter) of the queue 117B are the latest requests received at the purge queue manager 116B. Requests 6 and 7 are transmitted, in operation 435, to the purge request distributor 118O of another data center. While FIG. 5 illustrates the requests being sent to a single purge request distributor 118O, in some embodiments, the requests are sent to multiple purge request distributors in multiple geographic regions resulting in the purge requests being distributed in all data centers that cache the resource through the intermediary of the purge request distributors. The purge queue manager 116B further transmits, with the purge request, one or more identifiers of data centers to which the purge request is to be transmitted from the purge request distributor 118O. For example, as illustrated in FIG. 5, the purge queue manager 116B sends, at time 1A, DC_ID 12 and DC_ID 13 associated with the purge request 7, indicating that this request is to be forwarded to these two data centers. Additionally, the purge queue manager 116B sends DC_ID 14 and DC_ID 16 associated with the purge request 6, indicating that this request is to be forwarded to these two data centers. The purge queue manager 116B receives, at time 1, a list of data center identifiers to which requests are being transmitted from the purge request distributor 118O, and for each data center identifiers a corresponding cursor position, indicating the position in the queue that the data center reached in processing the requests of the queue. In some embodiments, the purge queue manager 116B also receives a queue front index indicating the current index of the element at the front of the purge request distributor's queue. In the illustrated example, the queue front is 6 referring to request 6 that is at the front of queue 127B of the purge request distributor 118O.

The purge queue manager 116B further stores data center identifiers 517B (e.g., 12, 13, 14, 15, 16, 17, 18) identifying data centers of system 100 that are to receive the requests. The purge request distributor 118O further stores data center identifiers 527B and cursor position. Each data center identifier is associated with a cursor position indicating the position in the queue at which the associated data center is processing purge requests from the queue. For example, at time 1B, the purge queue manager 116B receives an update from the purge request distributor 118O. The update includes for each data center the corresponding position in the queue that completed processing (e.g., DC_ID 12 and request 7, DC_ID 13 and request 7, DC_ID 14 and request 6, and DC_ID 16 and request 6). Upon receipt of the update, the purge queue manager 116B updates the data center's list 517B with the associated cursor position from the update. After processing of the update message, the purge queue manager 116B includes data center identifiers 12, 13, 14, 14, 16, 17, 18, which are respectively associated with cursor positions 7, 7, 6, 1, 6, 1, 1, indicating that data center with DC_ID 12 has processed request 7, data center with DC_ID 13 has processed request 7, data center with DC_ID 14 has processed request 6, data center with DC_ID 15 has processed request 1, data center with DC_ID 16 has processed request 6, data center with DC_ID 17 has processed request 1, data center with DC_ID 18 has processed request 1. In some embodiments, the purge request distributor 118O periodically transmits updates to purge queue manager 116B.

The purge queue 117B stores a record of all purges that are being processed in multiple data centers, which allows system 100 to automatically recover from a number of scenarios including connectivity issues of the data centers and/or the data centers coming back online after maintenance. Having a record of all purge requests since an issue arose (e.g., disconnection of a data center, or a data center going down) allows the purge queue manager 116B to resend those purges to the data center ensuring that all data centers receive and process the purge request.

The purge queue manager 116B continues to receive requests and transmit the request to the purge request distributor 118O. For example, at time 2A, the purge queue manager 116B transmits requests 8 and 9 to the purge request distributor 118O. Requests 8, 9 are added to the queue 117B and to the queue 127B. In some embodiments, the queue 127B is limited in size when compared to the queue 117B and contains a subset of the requests in queue 117B. When capacity of the queue 127B is reached, upon receipt of a new request, the earliest request is dropped from the queue. For example, at time 3A, upon receipt of new requests 10, 11, request 6 is dropped from the purge request distributor 118O. The drop of request 6 from the queue results in a drop of the data center 16 to which request 6 remained to be sent. When sending the update, the list at time 3B no longer includes an identifier of the data center 16. Upon receipt of the update, the purge queue manager 116B determines whether there are any identifiers of data centers not included in the update. In response to determining that the data center DC_ID 16 is no longer in the list of data centers received in the update, the purge queue manager 116B considers that this data center is no longer delegated to the purge request distributor 118O for forwarding purge requests. In some embodiments, in response to determining that the data center is no longer delegated to the purge request distributor 118O, the purge queue manager 116B transmits the outstanding purge request to the data center directly instead of broadcasting them through an intermediary purge request distributor.

In some embodiments, in addition to sending the purge request to one or more purge request distributors, the purge queue manager 116B sends the purge request 141 to one or more purge request ingesters of data centers in the same geographic region as the purge queue manager 116B. While not illustrated, the purge queue manager 116B can send the purge request to a purge request ingester that is located in the same data center 110B.

Figure 6:
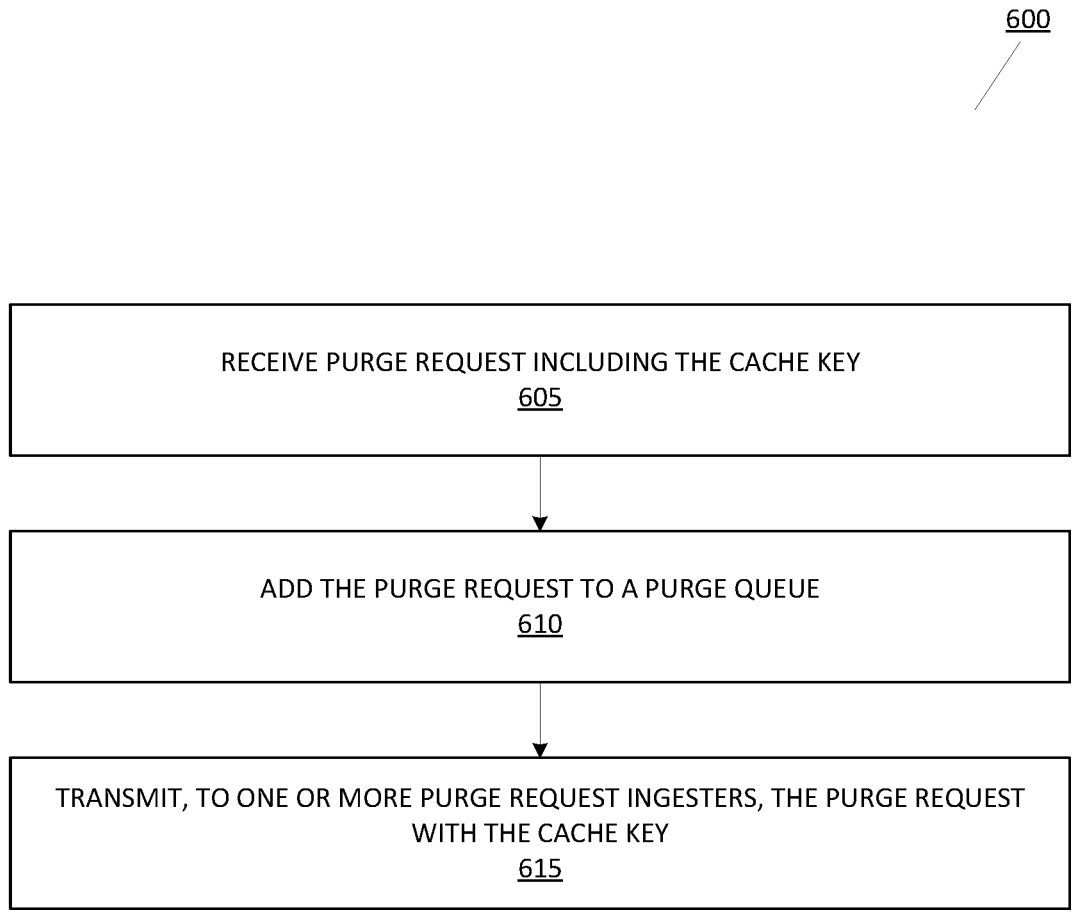
FIG. 6 is a flow diagram of exemplary operations that can be performed by purge request distributor upon receipt of a purge request, in accordance with some embodiments.

FIG. 6 is a flow diagram of exemplary operations 600 that can be performed by a purge request distributor upon receipt of a purge request, in accordance with some embodiments. The operations of FIG. 6 will be described with reference to the exemplary embodiment of FIG. 1. However, the operations of FIG. 6 can be performed by embodiments other than those discussed with reference to FIG. 1, and the embodiments discussed with reference to FIG. 1 can perform operations different than those discussed with reference to FIG. 6. The operations of FIG. 6 are described as being performed by a purge request ingester 112A.

In operation 605, each of the purge request distributors 118O and 118R receives one or more purge requests from the purge queue manager 116B. In some embodiments, the purge request distributors further receive a list of one or more data centers identified to which the purge request(s) are to be forwarded. In some embodiments, if the purge request distributor stores an identifier of a data center that is not included in the list received from the purge queue manager 116B, the purge request distributor 118O removes the data center from its local list. Additionally, or alternatively, if the request received from the purge queue manager 116B includes a data center identifier that is not included in the local list of the purge request distributor 118O, this data center identifier is added to the local list when the data center's cursor position is greater than the queue front index of the purge request distributor 118O. If the first queue index of the purge requests received at the purge request distributor 118O is not sequential to the back of the distributor's queue, then synchronization has been lost and the purge request distributor 118O clears its request queue and data center list before processing the newly received request(s).

In operation 610, the purge request distributor 118B adds the purge request to a purge queue, e.g., queue 127B. The purge request distributor 118O maintains a replica of entries from the queue 117B in the queue 127B. In some embodiments, the replica includes the most recent entries to the queue 117B. In an example, the replica is much shorter than the queue 117B, containing the most recent thousand purge requests. The flow of operations moves to operation 615.

In operation 615, the purge request distributor 118O transmits the purge request to one or more data centers as identified by the purge queue manager 116B. For example, the purge request distributor 118O sends purge request 145, which includes the cache key 114, to the purge request ingesters 112P-Q of the data centers 110P-Q.

Each of the purge request ingesters 112P-Q performs operations similar to the operations 200 performed by the purge request ingester 112A upon receipt of the purge request 140. In an embodiment, the purge request ingester 112A is the purge request ingester processing the purge request when it is initially received in system 100. The receipt of the request to purge the resource in the purge request ingesters 112P-Q results from the broadcast of the initial purge request 140 with the cache key that is generated from the purge of the resource in the data center 110A. Thus, in this case, each of the purge request ingester 112P-Q determines that the purge request includes the cache key 114, and in response to this determination, purges the resource from the cache of the respective data center without determining whether the purge request is valid, without generating a cache key for the resource (as has already been pre-computed for the resource), and without broadcasting the purge request with the cache key to other data centers. Processing the purge request 145 based on cache key 114, at each of the purge request ingesters, significantly speeds up the purge of the resource within the system 100 as the purge request ingesters 112P-Q skip multiple operations of processing a purge request based on the pre-computed cache key 114. The cache key 114 included in the purge request is an indication that the purge request is valid because the cache key is generated only after it has been determined that the purge request is valid. In some embodiments, the purge request distributor 118O uses an asynchronous queue instead of synchronous multicast requests to avoid potential cross-data center performance problems. For example, the use of the asynchronous queue allows to avoid a slowdown in other data centers, when one of the data centers experiences high latency.

In some embodiments, when processing the purge request 145, rate limiting counters may be incremented based on the purged resources. A purge rate limit counter is incremented by one for each resource purged by a purge request ingester. In some embodiments, while a rate limit can be reached, the rate limit is not enforced in these data centers. Thus, in these embodiments, the counters continue to be incremented to reflect a rate of processing purge requests in each data center, without canceling the purge of the resource if the rate is increased. This allows it to remain consistent with operations performed at the initial purge request ingester 112A, which only transmits a purge request to be broadcast when the rate limit is not exceeded at that data center and has already confirmed successful processing of the purge request to the requester. The continuous update of the rate limit counters allows consistency across the system 100 for processing of purge requests in the multiple data centers across multiple geographic regions. The consistency of the counters allows the enforcement of the rate limit for the next purge request(s) received at another initial purge request ingester that receives the next request even if the new purge request ingester receiving the new request is not the same as the purge request ingester 112A.

Worker Scripts

In some embodiments, each of the purge request ingesters (e.g., purge request ingesters 112A, 112C, 112O, and 112S) and the purge request distributors (e.g., purge request distributors 118O and 118R), includes code that can be deployed to all or some of the compute servers of the distributed networked system. The code can be, for example, a piece of JavaScript or other dynamically-typed language, a WebAssembly (WASM) compiled piece of code, or other compiled code. In an embodiment, the code is compliant with the W3C standard ServiceWorker application programming interface (API). In some embodiments, the code can, for example, intercept and answer hypertext transfer protocol (HTTP) requests and make outgoing HTTP subrequests as part of answering an HTTP request. In some embodiments, the code can, for example, intercept and answer purge requests as described in further details with reference to FIGS. 1-6. For the purposes of this description, each piece of code is referred to as a worker script and an executed instance of the worker script is referred to as a worker.

In some embodiments, a worker script is run in an execution environment in which a single process can safely run code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific example implementation, the worker script is run in an isolate of the V8 JavaScript engine.

Because a single process can run multiple isolated execution environments, the overhead of running the isolated execution environments is incurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like those experienced with other cloud computing platforms which means that more time is spent running the code instead of performing context switches. Also, because the implementations of the single process are shared between all isolated execution environments, the memory requirements are less than traditional cloud computing platforms.

Figure 7:
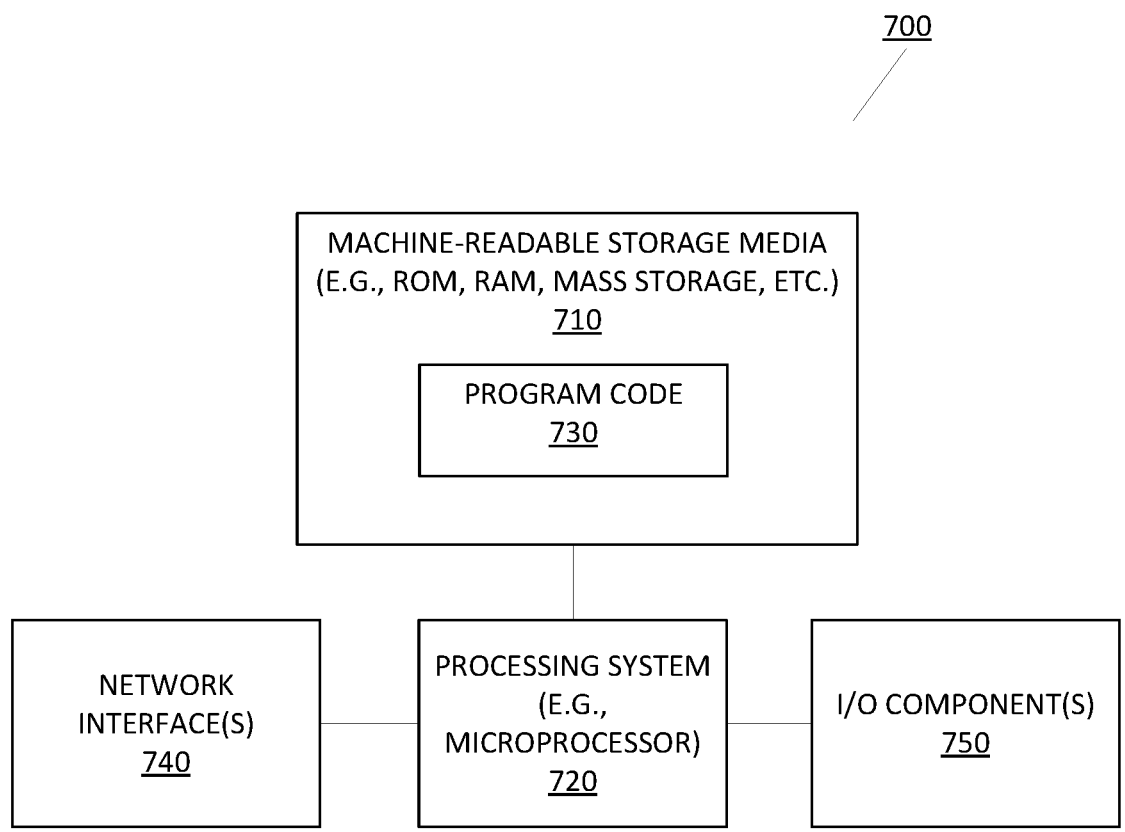
FIG. 7 illustrates a block diagram for an exemplary data processing system that may be used in some embodiments.

FIG. 7 illustrates a block diagram for an exemplary data processing system 700 that may be used in some embodiments. One or more such data processing systems 700 may be used to implement the embodiments and operations described with respect to the data centers, origin server, control server, or other electronic devices. The data processing system 700 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720 (e.g., one or more processors and connected system components such as multiple connected chips). For example, the depicted machine-readable storage media 710 may store program code 730 that, when executed by the processing system 720, causes the data processing system 700 to perform any of the operations described herein.

The data processing system 700 also includes one or more network interfaces 740 (e.g., a wired and/or wireless interfaces) that allows the data processing system 700 to transmit data and receive data from other computing devices, typically across one or more networks (e.g., Local Area Networks (LANs), the Internet, etc.). The data processing system 700 may also include one or more input or output ("I/O") components 750 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more buses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment may be implemented using different combinations of software, firmware, and/or hardware.

In the preceding description, numerous specific details are set forth. However, it is understood that embodiments may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is submitted that it is within the knowledge of one skilled in the art to effect such feature, structure, or characteristic in connection with other embodiments whether explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for purging resources from a cache in a distributed networked system, the method comprising:
   receiving, at a first data center of a plurality of data centers of the distributed networked system, a first purge request to purge a first resource from cache;
   determining that the first purge request does not include a first cache key for the first resource, and responsive to this determination:
      determining that the first purge request is valid,
      purging the first resource from cache of the first data center,
      generating the first cache key for the first resource, and
      causing a second purge request that includes the generated first cache key to be sent to one or more other data centers of the plurality of data centers of the distributed network system, the second purge request to purge the first resource;
   receiving, at the first data center of the plurality of data centers of the distributed network system, a third purge request to purge a second resource from cache; and determining that the third purge request includes a second cache key for the second resource, and responsive to this determination:
  not performing a determination of whether the third purge request is valid, and
  purging, based on the second cache key, the second resource from cache of the first data center.

2. The method of claim 1, wherein the determining that the first purge request is valid includes:
  determining that a requester of the first purge request is authorized to issue the first purge request for purging the first resource from cache; and
  determining, based on one or more rules for the first resource, that the first resource can be stored in cache.

3. The method of claim 2, wherein the one or more rules includes determining that a bypass cache setting is not applicable for the first resource.

4. The method of claim 1, further comprising:
  receiving, at the first data center, a fourth purge request to purge a third resource from cache; and
  determining that the fourth purge request does not include a third cache key for the third resource, and responsive to this determination:
    determining that the fourth purge request is not valid, and responsive to this determination, transmitting a message indicating that the fourth purge request cannot be performed.

5. The method of claim 1, wherein the generating the first cache key for the first resource includes:
  hashing a concatenated string of elements associated with the first resource to obtain the first cache key.

6. The method of claim 1, wherein causing the second purge request that includes the generated first cache key to be sent to one or more other data centers of the plurality of data centers includes:
  transmitting the second purge request to a purge queue manager that handles broadcasting the second purge request to the one or more other data centers of the plurality of data centers and managing a queue of purge requests.

7. The method of claim 6, wherein the purge queue manager broadcasts the second purge request to each other data center of the plurality of data centers that are in a same region as the first data center and broadcasts the second purge request to a purge request distributor in each other region for broadcasting the second purge request to data centers in each other region.

8. A non-transitory machine-readable storage medium that provides instructions that, if executed by one or more processors of a compute server of a distributed network system will cause the compute server to perform operations comprising:
  receiving, at the compute server of the distributed networked system, a first purge request to purge a first resource from cache, wherein the compute server is part of a first data center of a plurality of data centers of the distributed networked system;
  determining that the first purge request does not include a first cache key for the first resource, and responsive to this determination:
    determining that the first purge request is valid,
    purging the first resource from cache of the first data center,
    generating the first cache key for the first resource, and
    causing a second purge request that includes the generated first cache key to be sent to one or more other data centers of the plurality of data centers of the distributed network system, the second purge request to purge the first resource;
  receiving, at the compute server, a third purge request to purge a second resource from cache; and
  determining that the third purge request includes a second cache key for the second resource, and responsive to this determination:
    not performing a determination of whether the third purge request is valid, and
    purging, based on the second cache key, the second resource from cache of the first data center.

9. The non-transitory machine-readable storage medium of claim 8, wherein the determining that the first purge request is valid includes:
  determining that a requester of the first purge request is authorized to issue the first purge request for purging the first resource from cache; and
  determining, based on one or more rules for the first resource, that the first resource can be stored in cache.

10. The non-transitory machine-readable storage medium of claim 9, wherein the one or more rules includes determining that a bypass cache setting is not applicable for the first resource.

11. The non-transitory machine-readable storage medium of claim 8, wherein the operations further comprise:
  receiving, at the compute server, a fourth purge request to purge a third resource from cache; and
  determining that the fourth purge request does not include a third cache key for the third resource, and responsive to this determination:
    determining that the fourth purge request is not valid, and responsive to this determination, transmitting a message indicating that the fourth purge request cannot be performed.

12. The non-transitory machine-readable storage medium of claim 8, wherein the generating the first cache key for the first resource includes:
  hashing a concatenated string of elements associated with the first resource to obtain the first cache key.

13. The non-transitory machine-readable storage medium of claim 8, wherein causing the second purge request that includes the generated first cache key to be sent to one or more other data centers of the plurality of data centers includes:
  transmitting the second purge request to a purge queue manager that handles broadcasting the second purge request to the one or more other data centers of the plurality of data centers and managing a queue of purge requests.

14. The non-transitory machine-readable storage medium of claim 13, wherein the purge queue manager broadcasts the second purge request to each other data center of the plurality of data centers that are in a same region as the first data center and broadcasts the second purge request to a purge request distributor in each other region for broadcasting the second purge request to data centers in each other region.

15. A compute server of a distributed networked system, comprising:
  a set of one or more processors; and
  a set of one or more non-transitory machine-readable storage mediums coupled with the set of one or more processors that stores instructions that, when executed by the set of one or more processors, causes the compute server of the distributed networked system to perform operations including:

receiving, at the compute server of the distributed network system, a first purge request to purge a first resource from cache, wherein the compute server is part of a first data center of a plurality of data centers of the distributed networked system;

determining that the first purge request does not include a first cache key for the first resource, and responsive to this determination:

determining that the first purge request is valid, purging the first resource from cache of the first data center, generating the first cache key for the first resource, and causing a second purge request that includes the generated first cache key to be sent to one or more other data centers of the plurality of data centers of the distributed network system, the second purge request to purge the first resource;

receiving, at the compute server, a third purge request to purge a second resource from cache; and determining that the third purge request includes a second cache key for the second resource, and responsive to this determination:

not performing a determination of whether the third purge request is valid, and purging, based on the second cache key, the second resource from cache of the first data center.

16. The compute server of the distributed networked system of claim 15, wherein the determining that the first purge request is valid includes:

determining that a requester of the first purge request is authorized to issue the first purge request for purging the first resource from cache; and determining, based on one or more rules for the first resource, that the first resource can be stored in cache.

17. The compute server of the distributed networked system of claim 16, wherein the one or more rules includes determining that a bypass cache setting is not applicable for the first resource.

18. The compute server of the distributed networked system of claim 15, wherein the operations further comprise:

receiving, at the compute server, a fourth purge request to purge a third resource from cache; and determining that the fourth purge request does not include a third cache key for the third resource, and responsive to this determination:

determining that the fourth purge request is not valid, and responsive to this determination, transmitting a message indicating that the fourth purge request cannot be performed.

19. The compute server of the distributed networked system of claim 15, wherein the generating the first cache key for the first resource includes:

hashing a concatenated string of elements associated with the first resource to obtain the first cache key.

20. The compute server of the distributed networked system of claim 15, wherein causing the second purge request that includes the generated first cache key to be sent to one or more other data centers of the plurality of data centers includes:

transmitting the second purge request to a purge queue manager that handles broadcasting the second purge request to the one or more other data centers of the plurality of data centers and managing a queue of purge requests.

* * * * *